Figure 1:
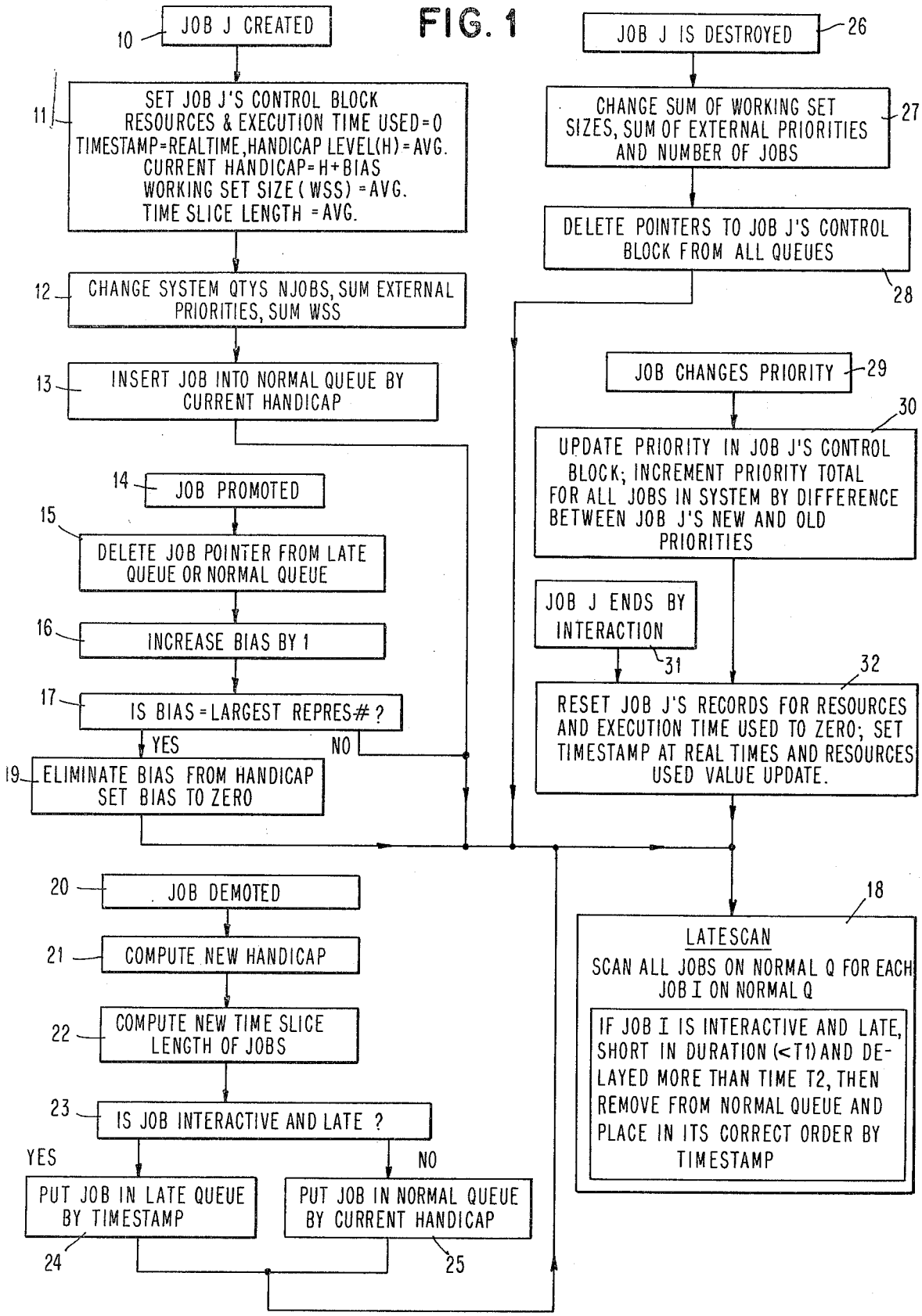
Figure 2:
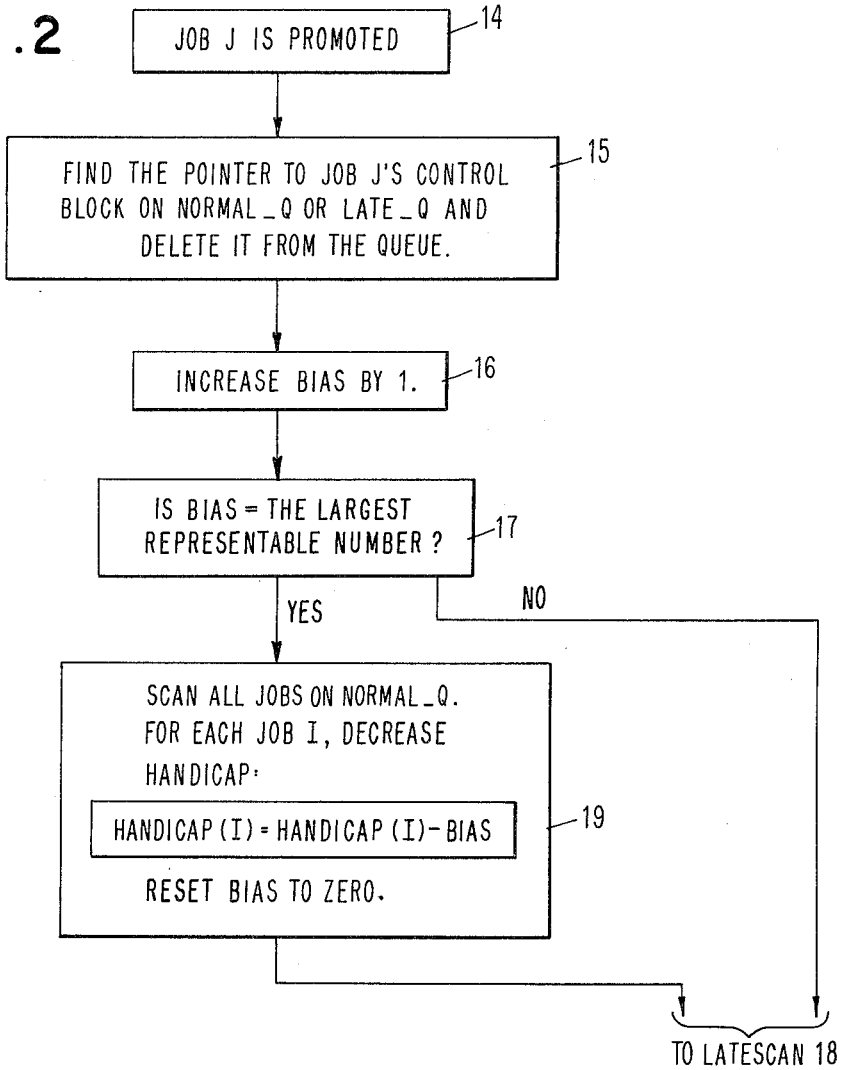
Figure 3:
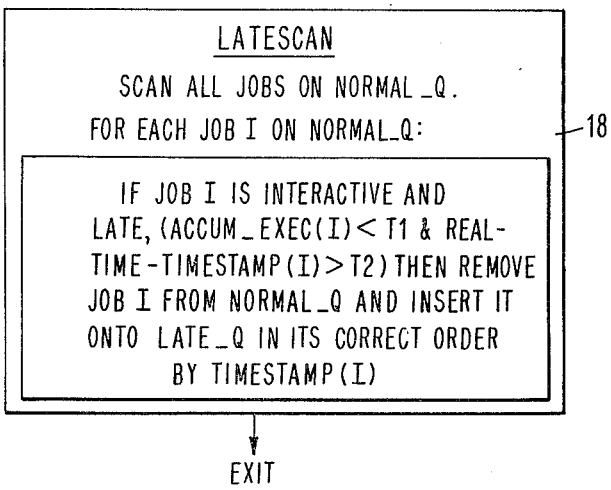
Figure 4:
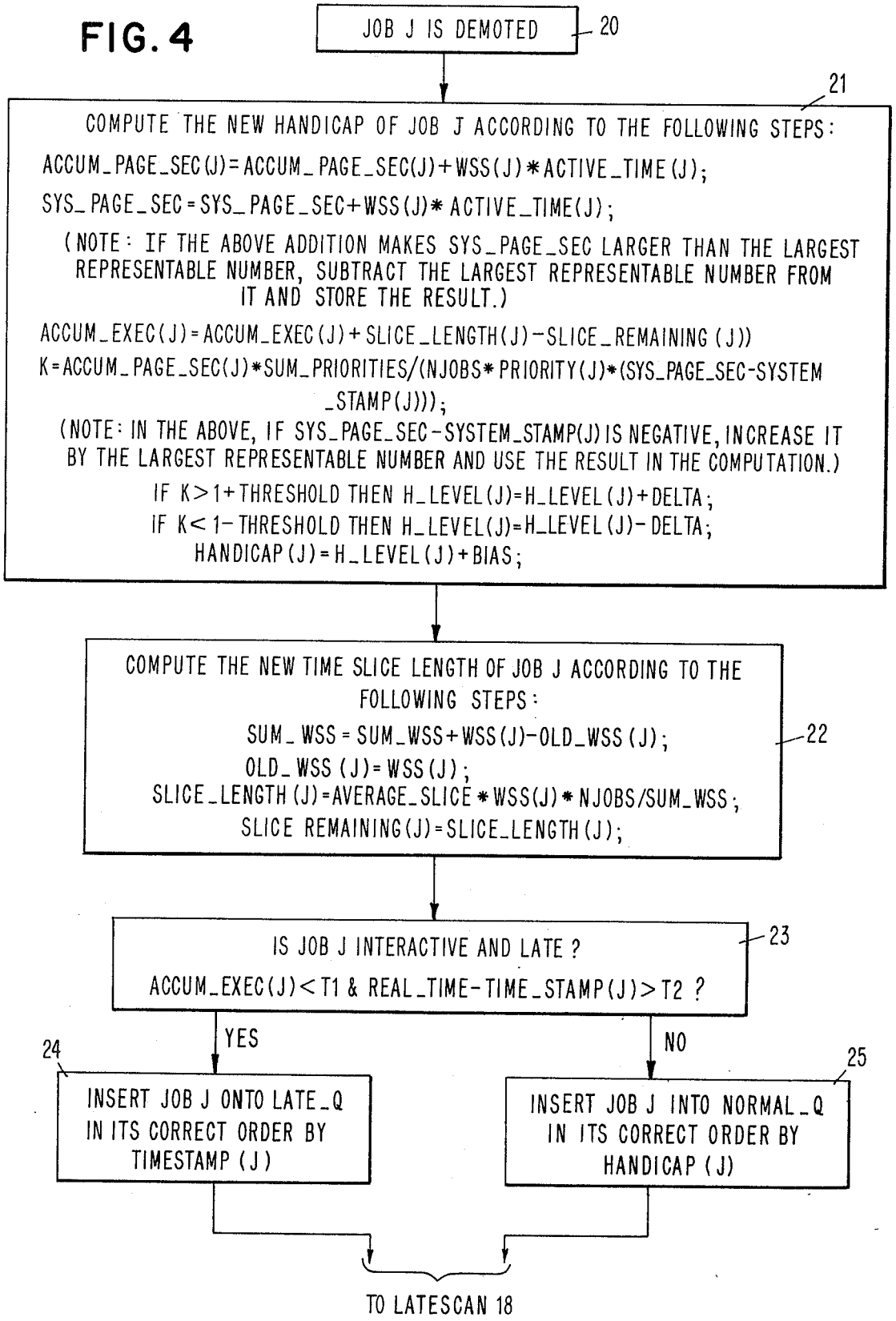
Figure 5:
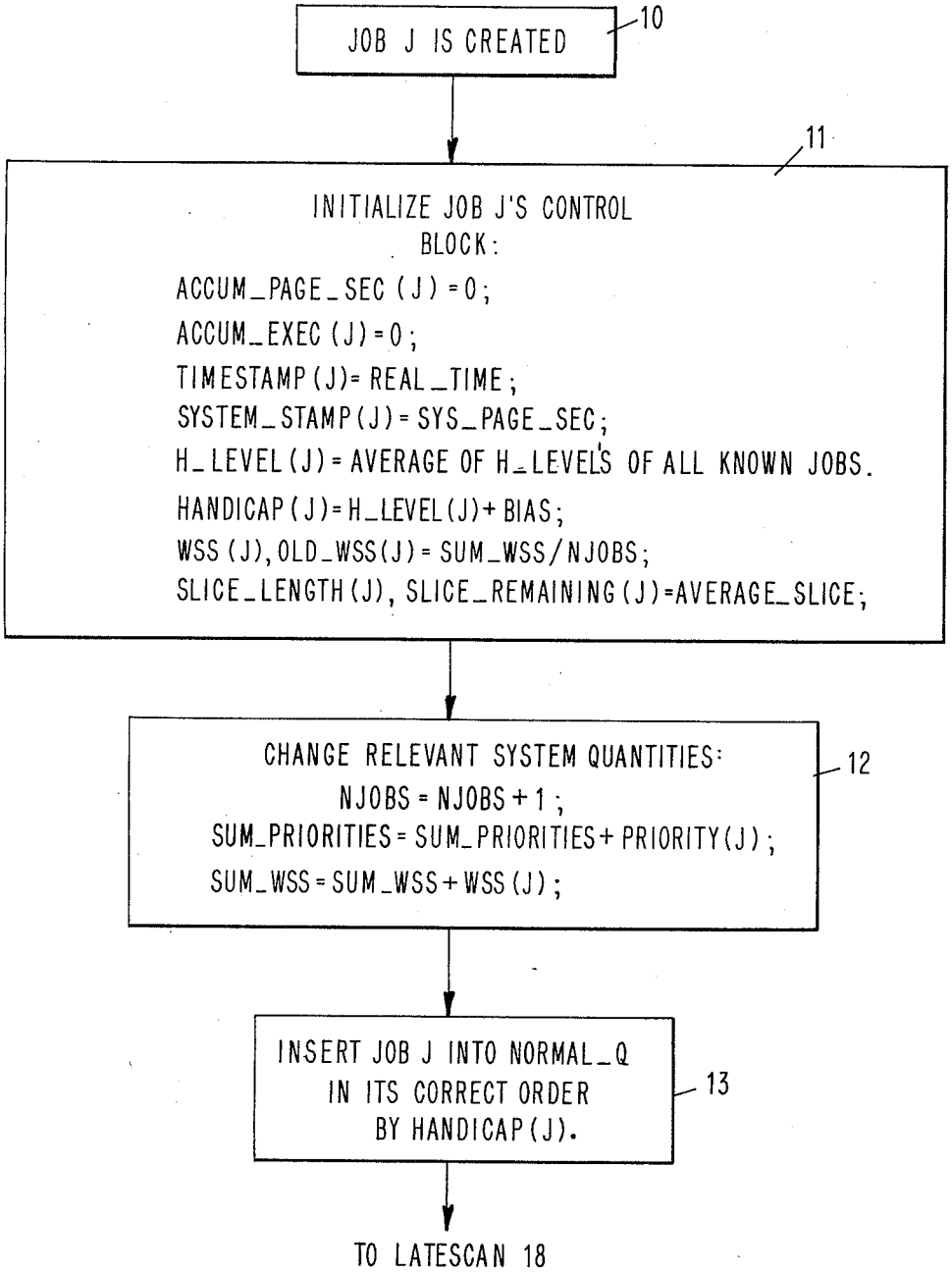
Figure 6:
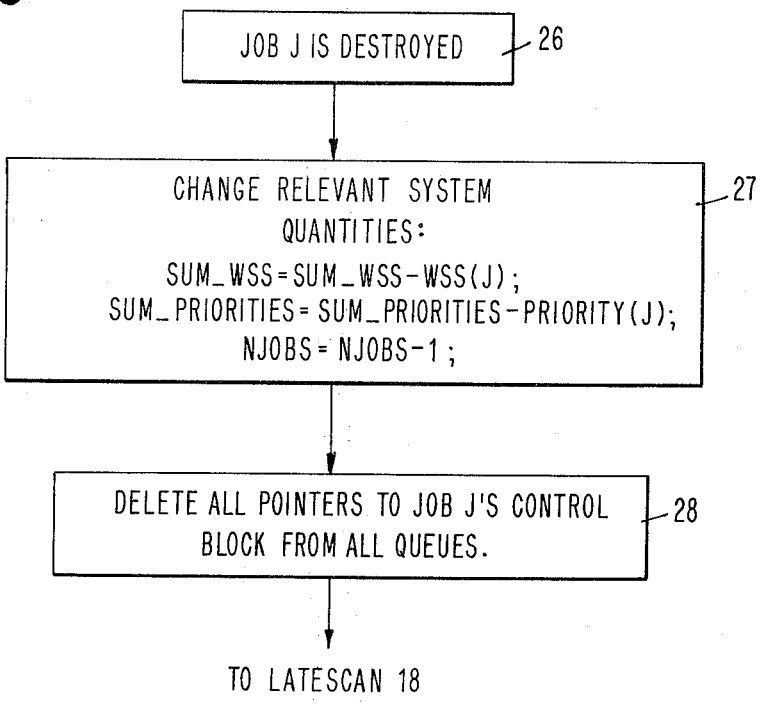
Figure 7:
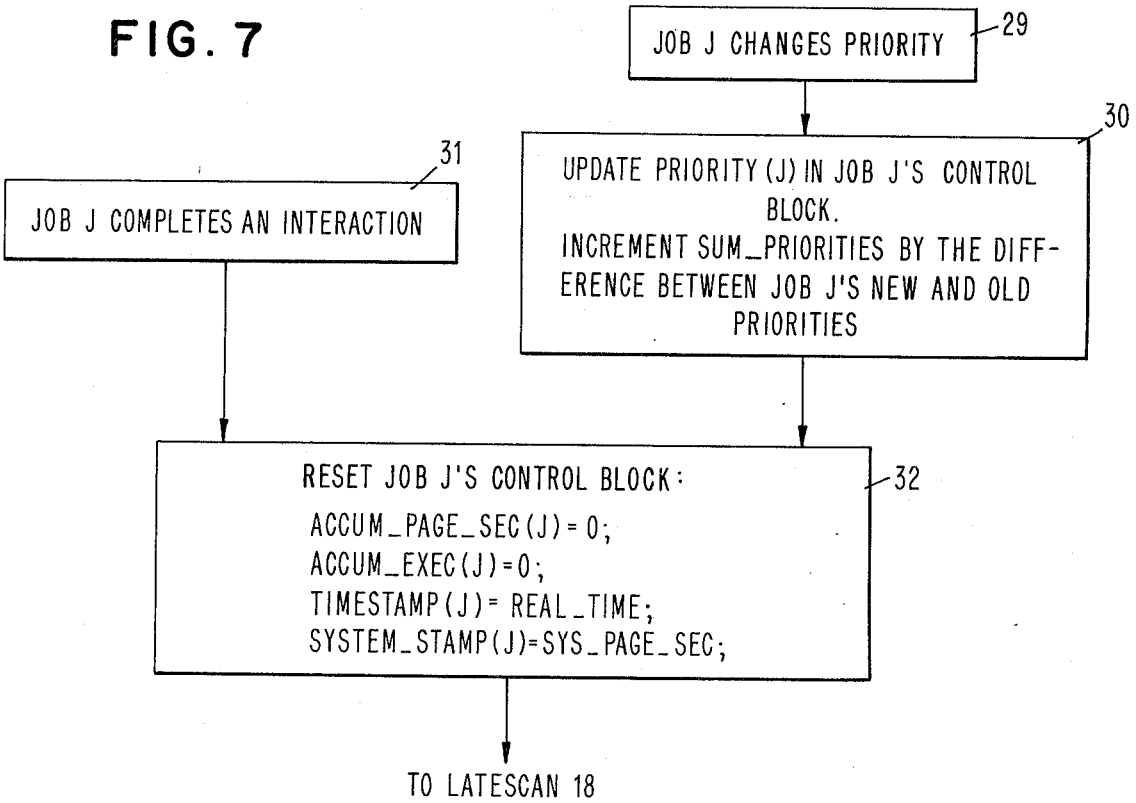

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED OCTOBER 7, 1975

939 O.G. 9

T939,009

SCHEDULING MECHANISM FOR INTERACTIVE SYSTEMS WITH VIRTUAL MEMORY

Donald Dean Chamberlin, San Jose, Calif., assignor to International Business Machines Corporation, Armonk, N.Y.

Filed Mar. 13, 1974, Ser. No. 450,621
**Int. Cl. G06f *9/12***
U.S. Cl. 444—1
5 Sheets Drawing. 7 Pages Specification

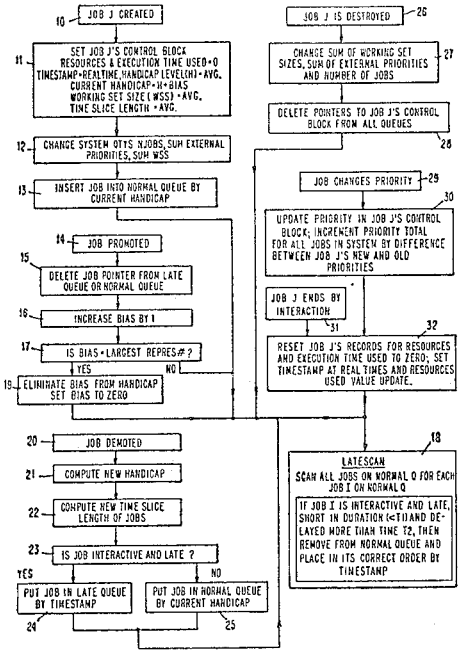

A job is created and a job control unit records the amount of main storage required as well as the handicap plus bias which will determine how fast the job will be promoted to the multiprogramming set of jobs currently being performed by the system. Waiting jobs are assigned different handicaps based upon their external priorities. Jobs added later have higher handicaps by the amount of a bias incremented upon each promotion until it is so large that all handicaps must be decremented by the amount of the bias. In this way earlier jobs have lower handicaps with time and eventually even jobs with high initial handicaps receive service at the rate intended with respect to jobs with lower handicaps. Jobs which are interactive and late are placed in a late queue for faster service, to assure interactive users faster service. On demotion a job receives a feedback adjustment of its handicap by means of a K factor adjustment. Jobs are scheduled to provide adequate response time and equitable allocation of system resources.